United States Patent
Suzuki et al.

(10) Patent No.: US 6,201,324 B1
(45) Date of Patent: Mar. 13, 2001

(54) STATOR POLE TEETH FOR A CLAW POLE STEPPING MOTOR

(75) Inventors: Yuzuru Suzuki; Sakae Fujitani; Masaki Kagawa, all of Shizuoka-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 09/361,757

(22) Filed: Jul. 27, 1999

(30) Foreign Application Priority Data

Jul. 28, 1998  (JP) .................................................. 10-212248

(51) Int. Cl.$^7$ ...................................................... H02K 11/12
(52) U.S. Cl. .................................................. 310/57; 29/596
(58) Field of Search ................................ 310/257, 49 R, 310/43, 218, 254, 263; 29/596

(56) References Cited

U.S. PATENT DOCUMENTS

| | | | |
|---|---|---|---|
| 3,633,055 | * | 1/1972 | Maier ..................................... 310/156 |
| 3,691,414 | * | 9/1972 | Kappius et al. .................... 310/49 R |
| 3,803,430 | * | 4/1974 | Costa et al. ..................... 310/40 MM |
| 4,087,709 | * | 5/1978 | Haydon .................................. 310/83 |
| 4,185,215 | * | 1/1980 | Montagu ............................... 310/83 |
| 4,593,216 | * | 6/1986 | Willcox .............................. 310/49 R |
| 4,695,419 | * | 9/1987 | Inariba ................................. 264/259 |
| 5,121,017 | * | 6/1992 | Yamamoto et al. ................ 310/49 R |
| 5,170,082 | * | 12/1992 | Nakagawa et al. ..................... 310/45 |
| 5,283,487 | * | 2/1994 | Oki et al. .......................... 310/49 R |
| 5,543,677 | * | 8/1996 | Fakler ................................. 310/263 |
| 5,607,525 | * | 3/1997 | Gay ..................................... 156/62.8 |
| 5,691,583 | * | 11/1997 | Suzuki et al. ..................... 310/49 R |
| 5,770,900 | * | 6/1998 | Sato et al. ......................... 310/49 R |
| 5,818,143 | * | 10/1998 | Suzuki et al. ........................ 310/257 |
| 5,890,277 | * | 4/1999 | Kliman ................................. 29/596 |

OTHER PUBLICATIONS

Patent Abstracts of Japan, vol. 17,No. 535 (E–1439), Sep. 27, 1993 (1993–09–27) –& JP 05 146137 A (Copal Electron Co Ltd), Jun. 11, 1993 (Jun. 11, 1993)*abstract; figures 1–7*.

Patent Abstracts of Japan, vol.15,No. 118 (E–1048), Mar. 22, 1991 (Mar. 22, 1991) –& JP03 007050A (Seiko Epson Corp), Jan. 14, 1991 *abstract; figures 1,2,5,7*.

Patents Abstracts of Japan, vol. 18,No. 493 (E–1606), Sep. 14, 1994 –& JP 06 165467 A (Sony Corp), Jun. 10, 1994 *abstract; figures 1–6*.

* cited by examiner

*Primary Examiner*—J Waks
(74) *Attorney, Agent, or Firm*—Fay, Sharpe, Fagan, Minnich & McKee, LLP (57) ABSTRACT

A stator structure enables a claw pole motor to be reduced in diameter and to highly increase its performance. In a stator structure of the claw pole stepping motor comprising a stator that constitutes magnetic circuits in yokes 2 and 3 made by sheet metal working of a soft magnetic steel plate and a rotor that is disposed inside the stator for rotation; pole teeth 4 made of soft magnetic material are provided as separate parts independent of the yokes 2 and 3, and held at the inner circumference of a bobbin 5 made of polymeric material, thereby allowing easy manufacturing of a long stator or a stator with a small diameter for which the pole teeth 4 have difficulty, otherwise, in being well organized, at the same time allowing the area of cross section of the pole teeth 4 to be arbitrarily determined so as not to cause magnetic saturation, allowing to provide a high output power, allowing to determine the pole teeth 4 in the bobbin 5 so as not to disorder the arrangement of the pole teeth 4 which are responsible for the step angle accuracy, and thus allowing to accomplish high accuracy in step angle accuracy.

16 Claims, 8 Drawing Sheets

STATOR POLE TEETH FOR A CLAW POLE STEPPING MOTOR

BACKGROUND OF THE INVENTION

1. Field of the Invention

The present invention relates to a stator structure of a claw pole stepping motor and, more particularly, to an improvement in performance, and reduction in diameter and production cost attained by improvement in construction of the stator.

2. Description of the Prior Arts

Recently, remarkable progress has been made for various devices in performance and particularly in miniaturization. Accordingly, various devices have adopted a plurality of specific motors as required for their functions. Stepping motors are best suited in particular for requirement of positioning control. However, they have not been adopted due to limitations on the miniaturization of motors.

Figure 1A:
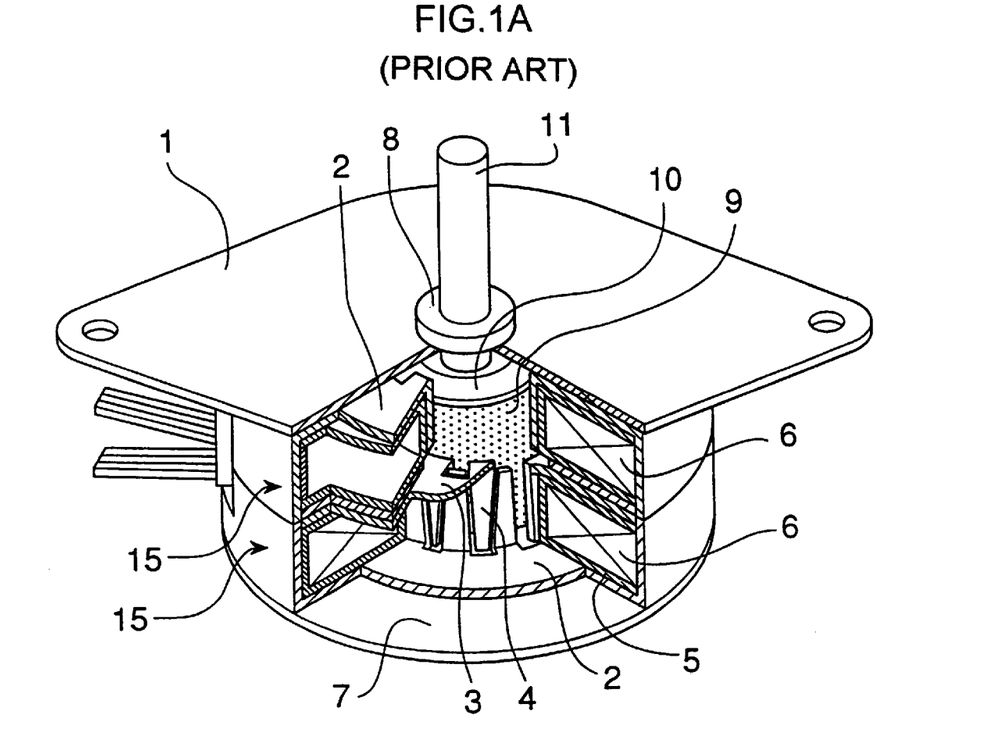
FIG. 1A is a partly sectional perspective view showing a stator structure of a conventional claw-pole stepping motor and FIG. 1B is an enlarged perspective view of pole teeth of the stator structure.
Figure 1B:
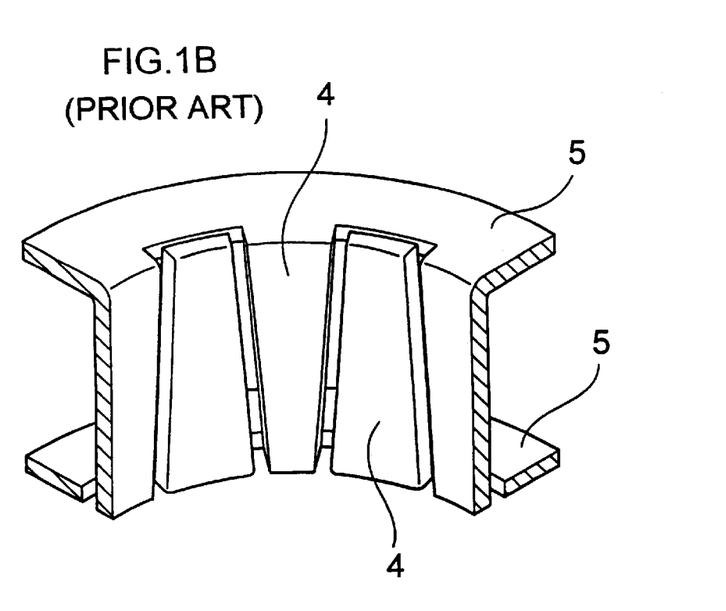

FIG. 1A is a partly sectional perspective view showing a stator structure of a conventional claw-pole stepping motor, and FIG. 1B is an enlarged perspective view showing pole teeth of the stator structure.

Referring to FIG. 1A, a motor is mounted on an upper flange 1 and an outer yoke 2 has, at the inner circumference thereof, pole teeth 4 that are made of a soft magnetic steel plate processed by sheet metal working. An inner yoke 3 also has, at the inner circumference thereof, pole teeth 4 that are made of a soft magnetic steel plate processed by sheet metal working. The yokes 2 and 3 are arranged such that a coil 6 with magnetic wires wound around a bobbin 5 is arranged therebetween and that the pole teeth 4 provided at the inner circumference of the yokes 2 and 3 face are combined with each other to constitute a pancake 15. Two pancakes 15 each with the yokes 2 and 3 and the coil 6 thus arranged are positioned back to back to constitute a stator. The outer yoke 2 of the lower pancake 15 as shown is provided with a lower flange 7 with a bearing 8 arranged at the center thereof. A sleeve 10 connects a rotor magnet 9 to a shaft 11 that provides the rotation center of the rotor.

Figure 2:
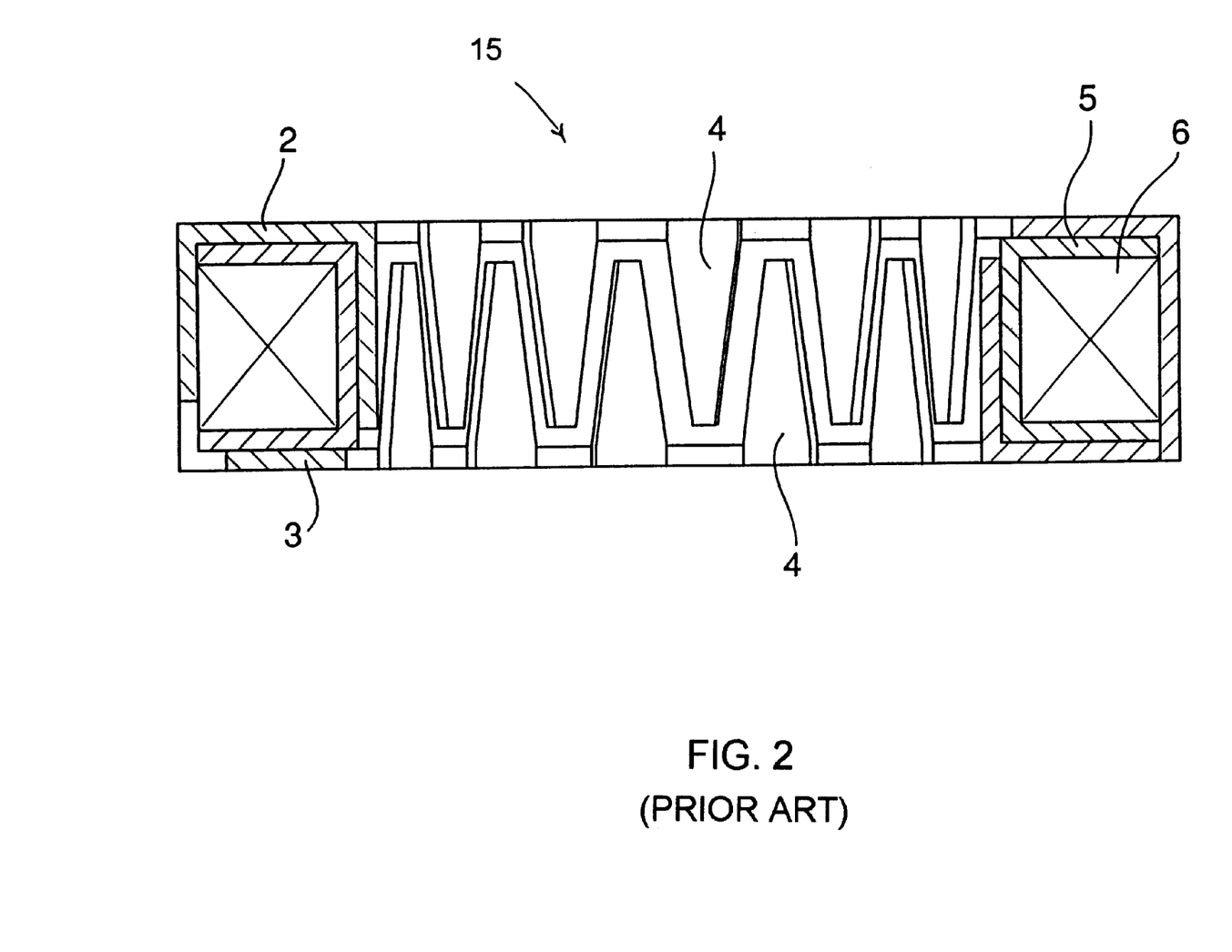
FIG. 2 is a cross-sectional view of the pancake shown in FIG. 1A.

FIG. 2 is a cross-sectional view showing the pancake of the claw pole stepping motor shown is FIG. 1A.

Particularly referring to the structure of the pole teeth 4 in the pancake 15 shown in FIG. 2, it will be understood that the pole teeth 4 are subject to stress caused by a sheet metal working process, and are thin in thickness, because the pole teeth 4 are formed by such process at the inner circumference of the yokes 2 and 3, respectively. Accordingly, the pole teeth 4 are liable to develop warping or bending as well.

As mentioned in the foregoing, a claw pole stepping motor has yokes 2, 3, and the pole teeth 4 manufactured in unitary structure. The smaller the diameter of the motor, the thinner the thickness of the material plate needed to secure a space for the coils and workability, and the shorter the height of the pole teeth as well. This might cause manufacturing difficulty and degradation of motor characteristics as well, thereby resulting in limiting the reduction in the diameter up to an outer diameter of 8 mm. This has resulted in provision of an encoder as a position detector in a DC motor for positioning control which results in an extremely expensive structure. However, considering the current environment regarding stepping motors, high-performance magnets such as the rare earth magnet have been developed for use in rotor magnets facing stators. This has laid the cornerstone for possibly improving the characteristics of the motor only if the stators can be worked properly and thus raised requirements for an appropriate method for manufacturing the stator.

SUMMARY OF THE INVENTION

The present invention has been made in view of the foregoing problems and its object is to provide a stator structure that enables the claw pole motor to be reduced in diameter and provide highly enhanced performance.

In order to achieve the foregoing object, a claw pole stepping motor comprising a stator that constitutes a magnetic circuit in yokes made of a soft magnetic steel plate by sheet metal working and a rotor disposed inside the stator for rotation, is characterized in that pole teeth made of soft magnetic material which face rotor magnets are provided as separate parts independent of the yokes.

Furthermore, the stator structure of the present invention is characterized by holding the pole teeth at the inner circumference of a bobbin made of polymeric material.

Furthermore, the stator structure of the present invention is characterized by having a relationship of $T1 \geq T2$ between the thickness T1 of a pole tooth and the plate thickness T2 of a yoke.

Furthermore, the stator structure of the present invention is characterized by having the relationship of $L \geq D/2$ between the length L of a pole tooth in the axial direction and the diameter D of the rotor.

Furthermore, the bobbin according to the stator structure of the present invention is characterized by having guide slots for positioning and holding a plurality of pole teeth arranged at the inner circumference of the bobbin, and guide portions for positioning and holding yokes and pole teeth on the end faces.

Furthermore, the stator structure of the present invention is characterized by providing stoppers for guide slots such that the length of a guide slot is shorter than that of a pole tooth in order to allow stable contact between the pole teeth and the yokes and also to obtain a good magnetic performance.

Furthermore, the stator structure of the present invention is characterized in that the guide portion serves as a holding portion for the pole teeth as well.

Furthermore, the stator structure of the present invention is characterized by forming the pole teeth in unitary structure with a bobbin by the insert molding.

Furthermore, the stator structure of the present invention is characterized in that the pole teeth is pressed into the yokes.

DETAILED DESCRIPTION OF THE PREFERRED EMBODIMENTS

The present invention will be described below with reference to the accompanying drawings.

Figure 3A:
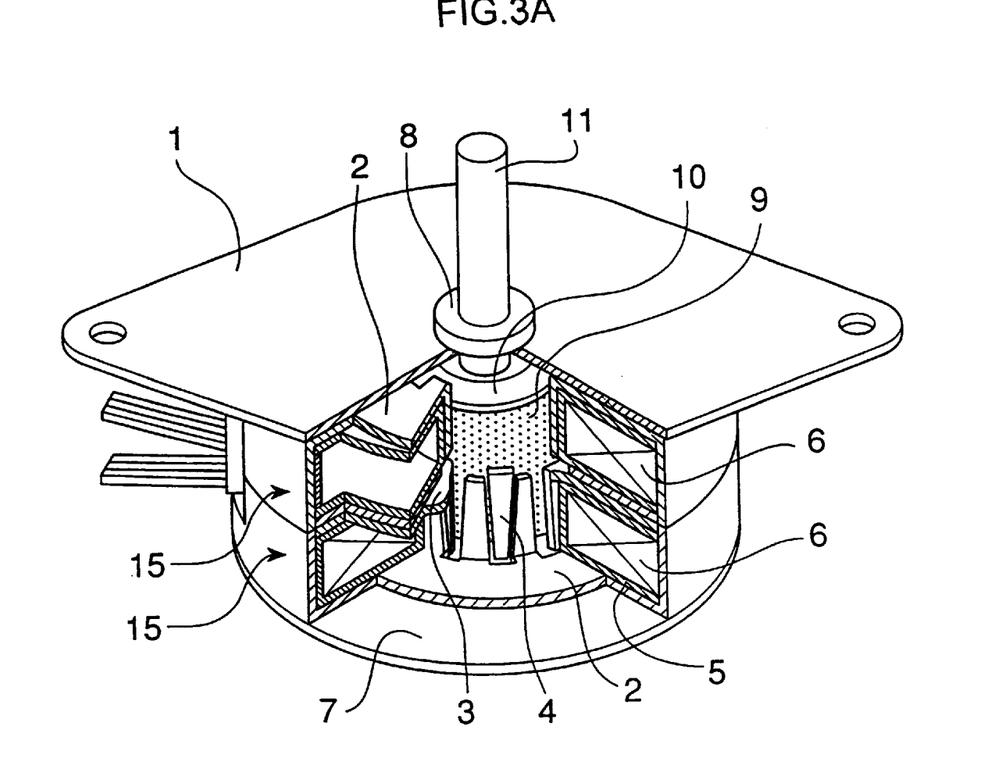
FIG. 3A is a partly sectional perspective view showing a stator structure of the claw-pole stepping motor according to the present invention and FIG. 3B is an enlarged perspective view showing pole teeth of the stator structure.
Figure 3B:
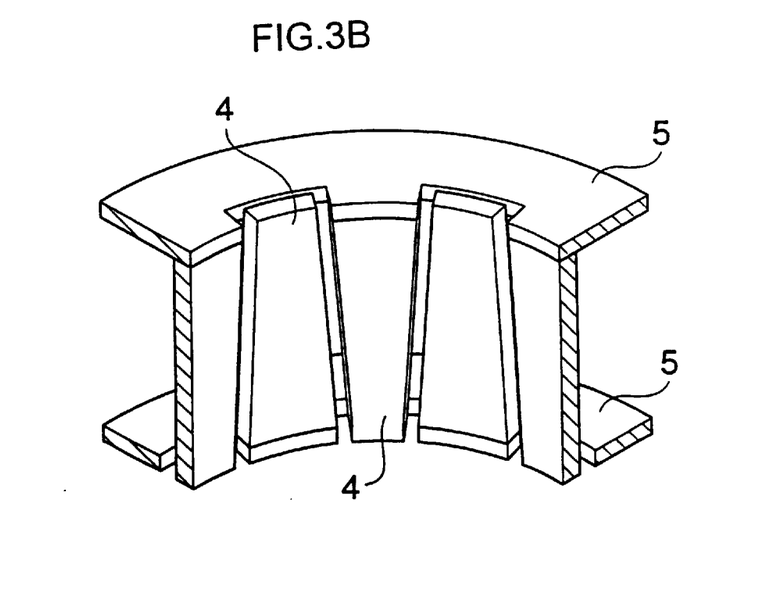

FIG. 3A is a partly sectional perspective view showing a stator structure of the claw-pole stepping motor according to the present invention and FIG. 3B is an enlarged perspective view showing the pole teeth of the stator structure.

Figure 5:
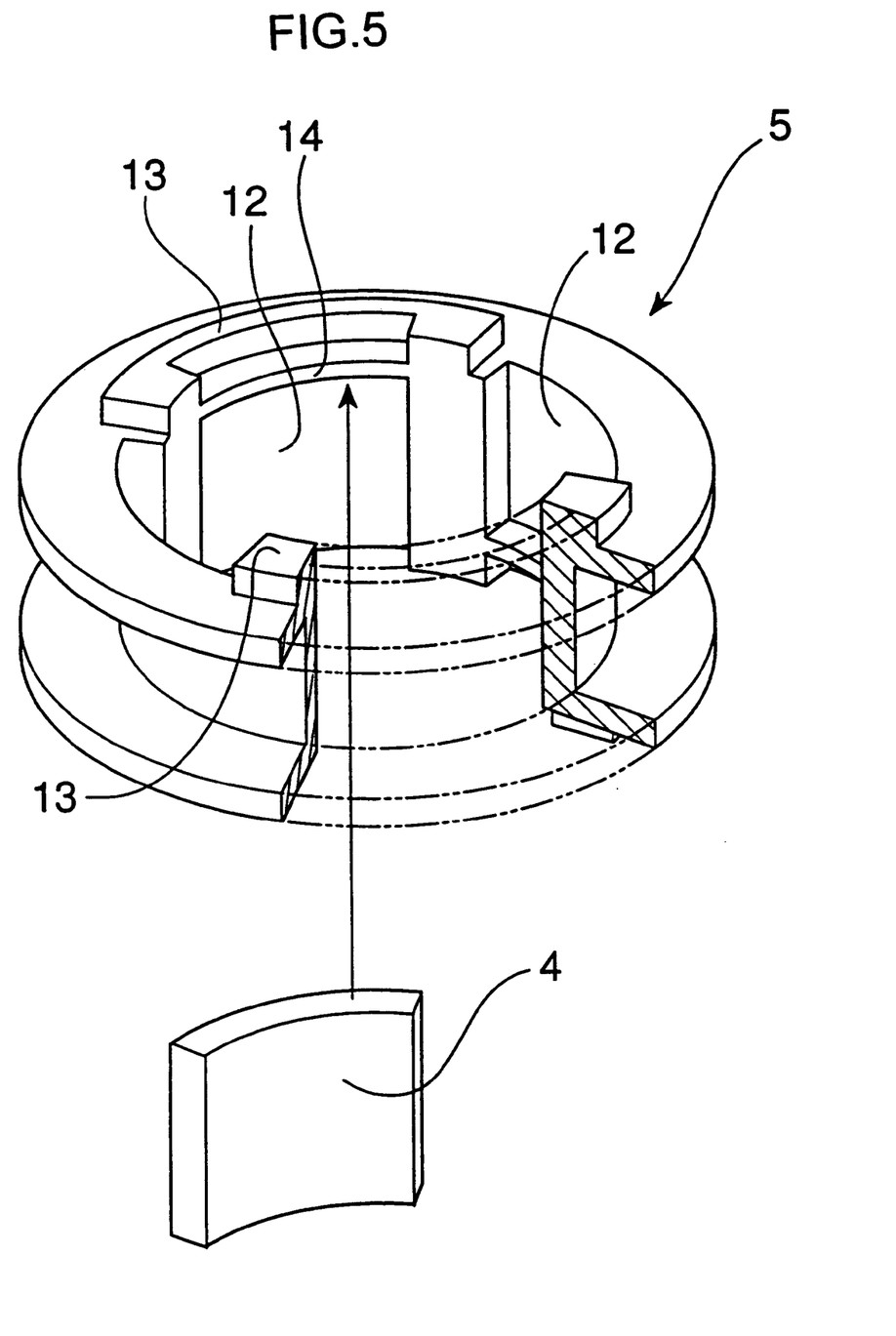
FIG. 5 is an explanatory view showing the bobbin of the present invention.

The First, brief explanation is given on the approximate configuration of the stator structure of the present invention is as follows. Pole teeth 4 are formed in separate units, independently, of stator yokes 2 and 3 so as not to be influenced by the rotor diameter and the plate thickness of stator yokes 2 and 3. The size of the pole teeth are determined to have length, width, and thickness required for the characteristics of the motor. The pole teeth are inserted into a plurality of slots 12 (4 slots for an 8 step motor) provided at the inner circumference face of the winding bobbin so as to contact alternately with the yokes 2 and 3 provided on both end faces of bobbin 5 as shown in FIG. 5. Referring to FIG. 5, the bobbin 5 is provided, on both end faces thereof, with guide portions 13 that fit in the yokes 2 and 3 for positioning the yokes 2 and 3, and pole teeth 4. Thus, it makes possible to easily provide a stator with a small diameter whose pole teeth 4 otherwise are hardly formed, and which is of large longitudinal length. At the same time, the cross sectional areas of the pole teeth 4 can be set to arbitrary values, so that this leads to pole teeth 4 having no magnetic saturation to provide high output power. Furthermore, the arrangement (assignment) of pole teeth 4 in the bobbin 5 is determined, so that the pole teeth 4, which determines accuracy of the step angle can be arranged accurately without disorder, and this allows accomplishment of high accuracy in step angle. Still furthermore, in order to secure pole teeth 4, a hole is provided in each of the yokes 2 and 3 to secure the pole teeth 4 therein, thereby improving the strength of connection between the pole teeth 4, and yokes 2 and 3. At the same time, the magnetic connection is stabilized thus improving both workability and characteristics.

In the embodiment of the present invention shown in FIGS. 3A and 3B, 1 designates an upper flange for mounting a motor, 2 designates an outer yoke that is processed by sheet metal working of a soft magnetic steel plate, and 3 designates an inner yoke that is also processed by sheet metal working of a soft magnetic steel plate. The bobbin 5, arranged between the yokes, around which magnetic wires are wound, has the pole teeth 4 arranged at the inner circumference thereof with each of the pole teeth 4 in alternate contact with the yokes 2 and 3. The yokes 2 and 3 are arranged with the bobbin 5 interposed therebetween with a coil 6 comprising magnetic wires wound therearound such that the pole teeth 4 provided at the inner circumference of the yokes face each other. Pancakes 15 each with the yokes 2 and 3 thus combined are positioned back to back to constitute a stator. A bearing 8 is arranged at the center of a lower flange 7. A sleeve 10 connects a rotor magnet 9 and a shaft 11 that is the rotation center of the rotor. The rotor magnet 9, the sleeve 10, and the shaft 11 constitute a rotor that is fitted and rotates in the center of the stator.

Herein, looking into the configuration of the pole teeth 4, the pole teeth 4 have thickness thicker than that of each yoke 2 and 3 so as to provide a necessary and sufficient cross sectional area for a magnetic circuit. In other words, if it is assumed that the plate thickness of the pole tooth 4 is T1 and the plate thickness of the yokes 2 and 3 is T2, the relationship is made to be $T1 \geq T2$. If it is assumed that the length of the pole tooth 4 in the axial direction is L and the diameter of the rotor is D, the relationship of $L \geq D/2$ is effective to avoid magnetic saturation to improve the motor characteristics.

Figure 4:
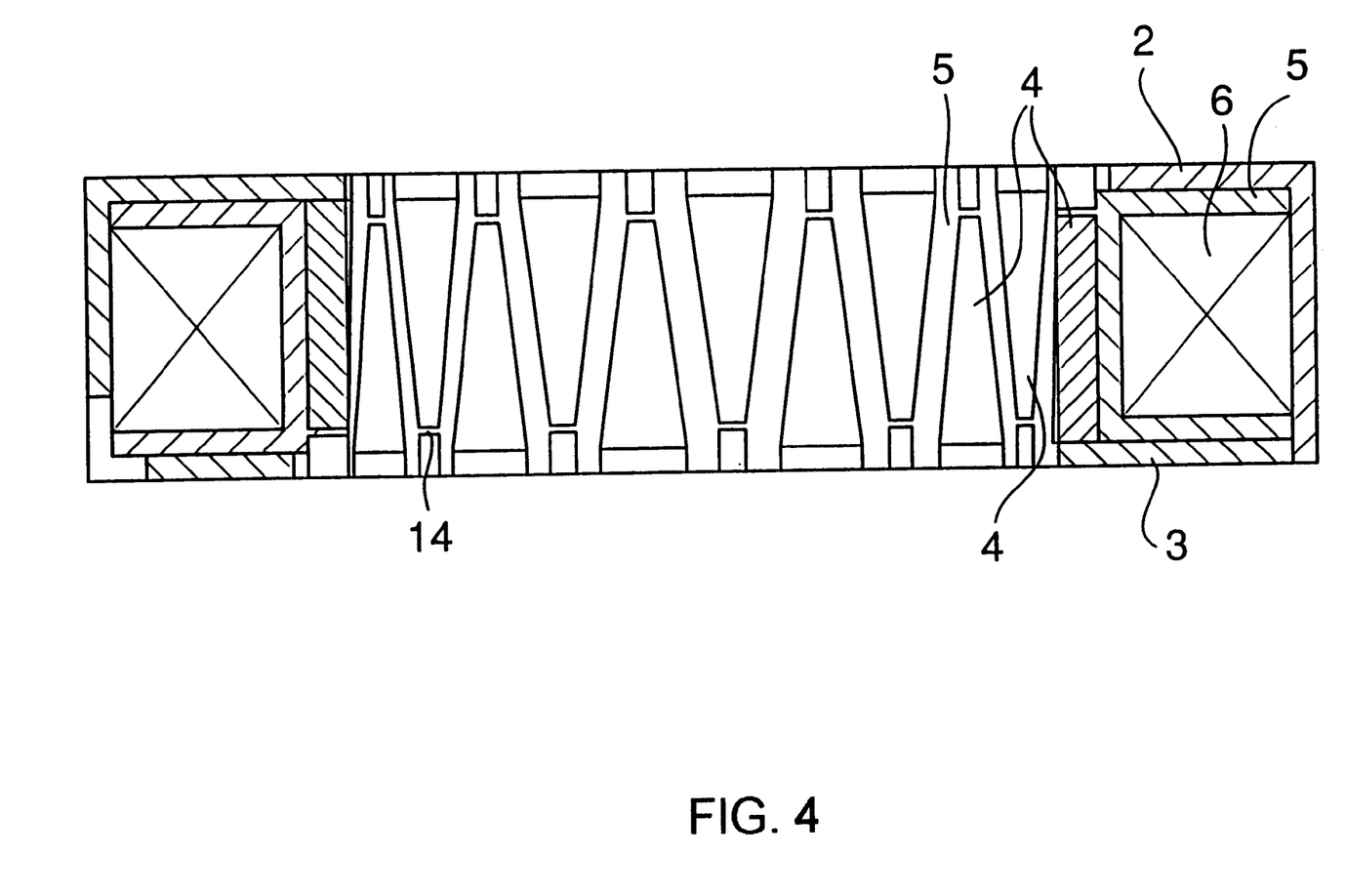
FIG. 4 is a cross-sectional view of the pancake shown in FIG. 3A.

FIG. 4 is a cross-sectional view showing the pancake the stepping motor shown in FIG. 3A and FIG. 5 is an explanatory view of a bobbin also used in the stepping motor.

Referring to FIGS. 4 and 5, four guide slots 12 are formed at equal intervals along the circumferential direction on the bobbin 5 for holding the pole teeth 4 (a straight type). The guide slot 12 is provided with a stopper 14 having resilience on a portion on which the top end portion of the pole tooth 4 abuts. Accordingly, making the length of the guide slot 12 slightly shorter than the length of the pole tooth 4 in the axial direction allows stable contact between the pole tooth 4 and the yoke 2 or 3 even if both lengths have some variation. Thus, this enables a stator structure with a good magnetic efficiency. Furthermore, guides 13 are arranged on the upper and lower end faces of the bobbin 5 and fits with each yoke to determine the position of the pole tooth 4.

Figure 6:
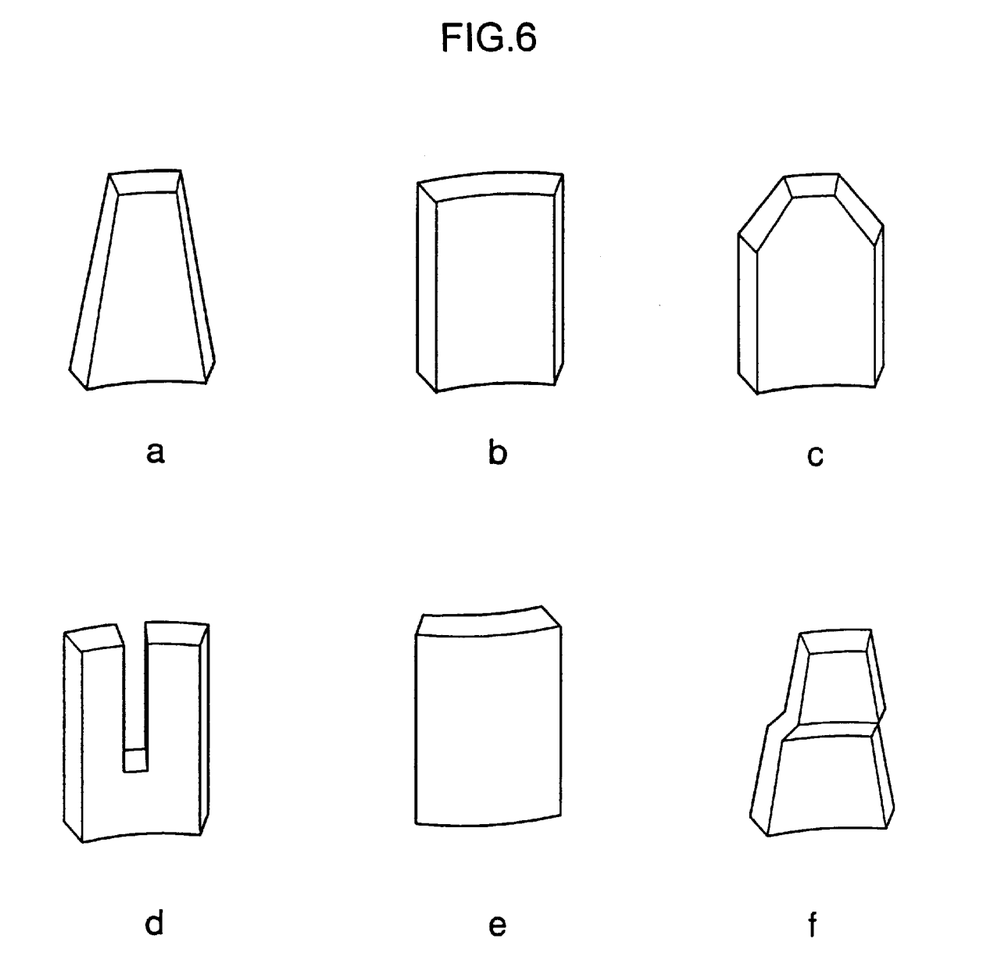
FIG. 6 is perspective views showing examples of various shapes of pole teeth of the present invention.

FIG. 6 are perspective views showing examples of various shapes of pole teeth. a is a triangular type, b is a straight type, c is a trapezoidal type, d is a slot type, e is a warped type, and L is a stepped type pole tooth 4. As a matter of course, any other types than those types are included in the category of the present invention.

Figure 7:
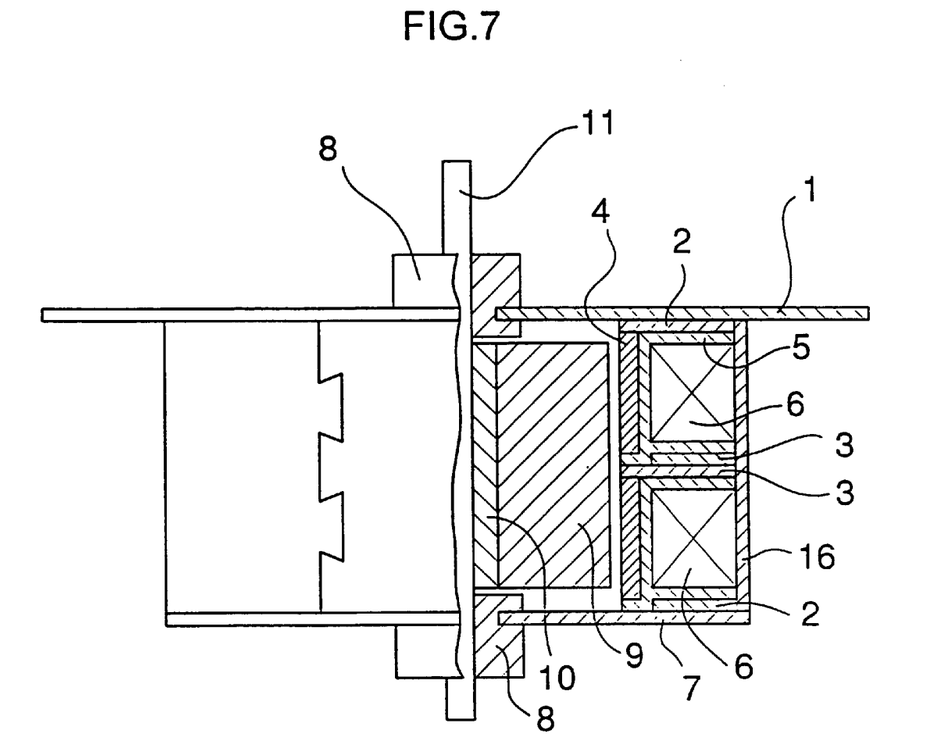
FIG. 7 is a view showing a stepping motor using a modified yoke according to the present invention.

FIG. 7 shows a stepping motor using a modified yoke wherein a ring-shaped yoke 16 and a disk-shaped inner yoke 3 are used. The ring-shaped yoke 16 is formed of a plate rounded into a cylinder. This requires no drawing process, thereby allowing remarkably improved manufacturing speed, and also increasing durability of molds and thus reducing manufacturing cost.

Figure 8:
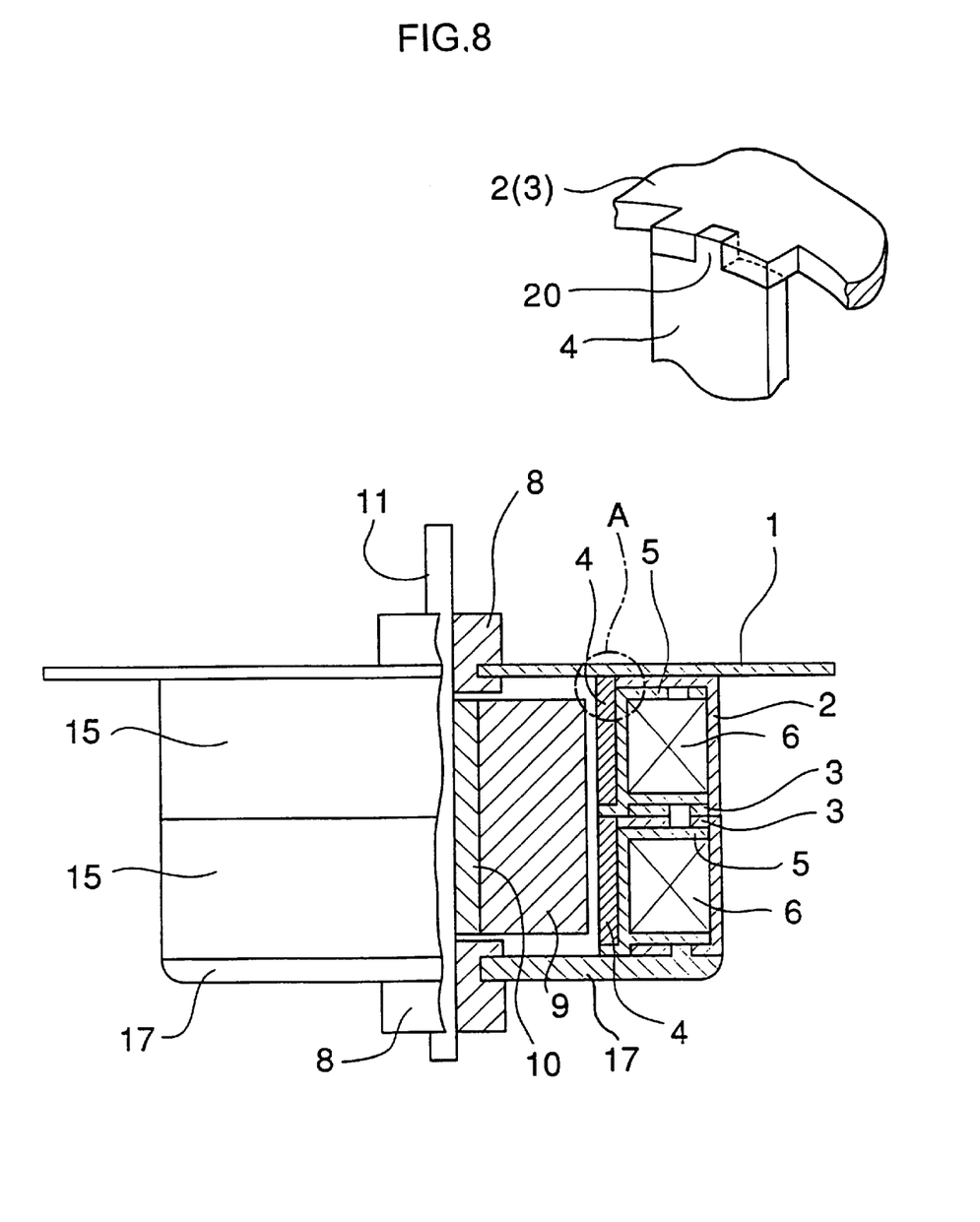
FIG. 8 is a view showing another stepping motor using a modified lower flange according to the present invention with the left half showing a front elevation and the right half showing a cross section.

FIG. 8 shows another stepping motor using a modified lower flange according to the present invention. The motor is shown with the left half in a front elevation and the right half in a cross section.

The lower flange 17 is formed by the insert molding. In this case, as shown in a large scale in FIG. 8, a projection 20 provided on the pole tooth 4 is pressed into the yokes 2 and 3, and then formed into unitary structure by the insert molding. This provides more advantageous effect than case where the pole teeth 4 are arranged at the inner circumference of the bobbin 5. It is to be understood that the shape of the projection 20 is not limited to the example as shown but various modifications are possible within the scope of the present invention as a matter of course.

According to the present invention, in a claw pole stepping motor with a stator structure comprising a stator constituting a magnetic circuit in yokes made of soft magnetic steel plates and a rotor that is fitted into the stator to rotate, pole teeth made of soft magnetic material as a separate part from the yokes are provided at the inner circumference of the bobbin made of polymeric material. This allows a stator of a small diameter and the pole teeth to be made freely in size. Consequently, a motor of a small diameter or a long motor that was previously unable to be made becomes available, and a motor of high-performance with good magnetic efficiency has been made available at low cost as well.

What is claimed is:

1. A claw pole stepping motor, comprising:
   a stator forming a magnetic circuit, the stator including:
   an inner yoke;
   an outer yoke, the inner and outer yokes having a soft magnetic steel plate;
   a bobbin including a polymeric material and arranged between the inner yoke and the outer yoke with a coil being wound around the bobbin;
   guide slots formed on an inner surface of the bobbin; and
   positioning guide portions and stoppers formed on respective first ends of each of the guide slots;
   a rotor disposed inside the stator for rotation; and
   a plurality of pole teeth, which are discrete and separate from both of the yokes and held at an inner circumference of the bobbin by the guide slots, the stoppers being resilient and causing respective lengths of the guide slots to be longitudinally shorter than lengths of the respective pole teeth for creating a stable contact between the pole teeth and both of the yokes.

2. The claw pole stepping motor according to claim 1, wherein a thickness T1 of each of the pole teeth is related to a plate thickness T2 of both of the yoke as $T1 \geq T2$.

3. The claw pole stepping motor according to claim 1, wherein a length L of the pole tooth in an axial direction and a diameter D of the rotor are related as $L \geq D/2$.

4. The claw pole stepping motor according to claim 1, wherein:
   the guide slots position and hold respective ones of the pole teeth around the inner circumference of the bobbins; and
   the guide portions position and hold the yokes and the pole teeth on end faces of the bobbin.

5. The claw pole stepping motor according to claim 3, wherein the positioning guide portions secure the pole teeth to the bobbin.

6. The claw pole stepping motor according to claim 1, wherein the pole teeth are formed as a unitary structure with the bobbin using insert molding.

7. The claw pole stepping motor according to claim 1, wherein the pole teeth are pressed into the inner and outer yokes.

8. The claw pole stepping motor according to claim 1, wherein an outer diameter of the claw pole stepping motor is less than about 8 mm.

9. The claw pole stepping motor according to claim 1, wherein the pole teeth have a triangular shape.

10. The claw pole stepping motor according to claim 1, wherein the pole teeth have a rectangular shape.

11. The claw pole stepping motor according to claim 10, wherein tips of the pole teeth have respective slots.

12. The claw pole stepping motor according to claim 1, wherein the pole teeth have a trapezoidal shape.

13. The claw pole stepping motor according to claim 1, wherein the pole teeth have a warped shape.

14. The claw pole stepping motor according to claim 1, wherein the pole teeth have a stepped shape.

15. A method of manufacturing a claw pole stepping motor, comprising:
    forming a stator, including:
    forming an inner yoke from a material including a soft, magnetic steel;
    forming an outer yoke from the material including the soft, magnetic steel;
    arranging a bobbin between the inner yoke and the outer yoke, a coil being wrapped around the bobbin;
    forming guide slots on an inner surface of the bobbin; and
    forming positioning guide portions and stoppers on respective first ends of each of the guide slots;
    disposing a rotor within the stator for rotation; and
    securing a plurality of pole teeth, which are discrete and separate from both of the yokes, to an inner surface of the bobbin via the guide slots, the stoppers being resilient and causing respective lengths of the guide slots to be longitudinally shorter than lengths of the respective pole teeth for creating a stable contact between the pole teeth and both of the yokes.

16. The method of manufacturing a claw pole stepping motor according to claim 15, further including:
    forming the pole teeth such that a thickness T1 of each of the pole teeth is related to a thickness T2 of respective plates of both of the yokes as $T1 \geq T2$.

* * * * *

UNITED STATES PATENT AND TRADEMARK OFFICE
CERTIFICATE OF CORRECTION

PATENT NO.      : 6,201,324 B1                                    Page 1 of 1
DATED           : March 13, 2001
INVENTOR(S)     : Suzuki et al.

It is certified that error appears in the above-identified patent and that said Letters Patent is hereby corrected as shown below:

<u>Drawings,</u>
    In Figure 1B, replace the numeral 5 in the upper portion of the figure with the numeral 3; and, replace the numeral 5 in the lower portion of the figure with the numeral 2.

In Figure 3B, replace the numeral 5 in the upper portion of the figure with the numeral 3; and, replace the numeral 5 in the lower portion of the figure with the numeral 2.

Signed and Sealed this

Eleventh Day of March, 2003

JAMES E. ROGAN
*Director of the United States Patent and Trademark Office*